United States Patent [19]

Rudiger et al.

[11] Patent Number: 4,825,750
[45] Date of Patent: May 2, 1989

[54] VACUUM BRAKING-FORCE BOOSTER

[75] Inventors: Eckhart Rudiger, Ebern; Hermann Bauer, Lülsfeld, both of Fed. Rep. of Germany

[73] Assignee: FAG Kugelfischer Georg Schafer (KGaA), Fed. Rep. of Germany

[21] Appl. No.: 747,403

[22] Filed: Jul. 2, 1985

[30] Foreign Application Priority Data

Jul. 3, 1984 [DE] Fed. Rep. of Germany ....... 3424410

[51] Int. Cl.⁴ .............................................. F15B 9/10
[52] U.S. Cl. .................................. 91/376 R; 91/369.1
[58] Field of Search .............. 91/369 R, 376 R, 369.2, 91/369.3, 369.4; 60/547.1

[56] References Cited

U.S. PATENT DOCUMENTS

| | | | |
|---|---|---|---|
| 3,199,298 | 8/1965 | Brown | 91/376 R X |
| 3,387,540 | 6/1968 | Wilson | 91/376 R X |
| 3,614,911 | 10/1971 | Belart | 91/376 R X |
| 3,807,280 | 4/1974 | Green et al. | 91/376 R X |

FOREIGN PATENT DOCUMENTS

| | | | |
|---|---|---|---|
| 1261411 | 2/1968 | Fed. Rep. of Germany | .... 91/376 R |
| 3318744 | 11/1984 | Fed. Rep. of Germany . | |
| 2046382 | 11/1980 | United Kingdom . | |

*Primary Examiner*—Robert E. Garrett
*Assistant Examiner*—Mark A. Williamson
*Attorney, Agent, or Firm*—Ostrolenk, Faber, Gerb & Soffen

[57] ABSTRACT

A vacuum breaking-force booster has a sequential control valve without a response path. First and second pressure chambers are separated by a diaphragm with a diaphragm disk in it and the diaphragm disk is connected with a shaft that supports a radially inward valve seat which presses against a spring biased sealing disk. Communication between the first and second chambers is past the inner valve seat. A shiftable sleeve extends through the lid of the first of the chambers and includes a collar which engages the inside of the lid for determining the maximum extend the sleeve can move out of the lid. A pressure piston extends through the sleeve. A bridge connects the sleeve with the pressure piston for moving together. An elastomeric bellows attaches the sealing disk to the sleeves and the pressure piston; the outer valve seat is defined on the sleeve for engaging the sealing disk. A spring normally urges the sealing disk toward both of the valve seats. A second flow path in the booster extends from the atmosphere through the bridge past the outer valve seat and into the first chamber. In an alternate embodiment, the outer valve seat is directly on the sleeve and the inner valve seat is directly on the valve shaft connected with the diaphragm disk. There is a return spring communicating with the diaphragm disk for urging the diaphragm disk to move the inner valve seat toward the sealing disk.

9 Claims, 2 Drawing Sheets

VACUUM BRAKING-FORCE BOOSTER

BACKGROUND OF THE INVENTION

The present invention relates to a vacuum braking force booster having a sequential control valve without response path.

Vacuum braking-force boosters are shown, for instance, in Federal Republic of Germany Pat. No. 12 61 411. In that case, the opening or closing of the sequential control valve is controlled by a piston rod which is connected to a sleeve which is displaceable within the diaphragm disk. The piston rod is mechanically coupled to the brake pedal. The working position is obtained by the displacement of the sleeve. But, boosting commences only when the inner valve seat of the equalizing valve, which seat is arranged on the diaphragm disk, is seated, after overcoming the valve closure path, against the valve disk and then the outer valve seat of the control valve, which seat is arranged in the sleeve, lifts off from the valve.

In order to improve this response, it is generally desirable to minimize the valve closure paths in order to eliminate the idle path of the brake pedal which results.

Attempts at solving this problem are already known from Japanese Pat. No. 57-198 158A and from Federal Republic of Germany Unexamined Application for Patent DE-OS No. 31 14 965. In that case, the unit which consists of the control valve piston and piston rod is provided on the control valve piston with a transverse bolt which penetrates through the piston or surrounds it and protrudes beyond the diameter of the piston neck of the booster piston. During return travel after a working stroke, the control valve piston lifts off with the bellows seal from the equalizing valve on the booster piston and by means of the transverse bolt, the control valve piston comes to a standstill and stops against the housing in front of the booster piston.

The valve clearance present during the return travel between the bellows seal and the equalizing valve seat on the booster piston is bridged over by the booster piston, which is pushed further by the return spring. Adaptation of the differential pressure between the rear and front chambers simultaneously takes place until the outer equalizing valve seal rests against the bellows seal. The arrangement of a transverse bolt having the function described above, however, requires an opening through the piston neck of the booster piston. This results in a reduction in the load-bearing cross sections on the booster piston and has an unfavorable effect on the strength of the part when the vacuum braking-force is acted on by the forces of reaction produced by the compressed reaction disk. Ordinary part tests, such as maximum extraction resistance without loss of function between control valve piston with the piston rod supported therein, which apply just as well for the transverse bolt which is connected with the control valve piston and lies on the housing, require a strong profiling and large cross sections of the booster piston. Furthermore, as a result of this, the cross sections of the flow channels passed through by the transverse bolt between the two chambers in the neck of the piston are reduced, which also has an unfavorable effect on the response and control behavior of the apparatus.

SUMMARY OF THE INVENTION

The object of the present invention is, therefore, to provide a vacuum braking-force booster having a sequential control valve without response path which eliminates the inactive stroke on the brake pedal and, to avoid the above-mentioned disadvantages, assures the formation and arrangement of flow channels of sufficiently large cross section.

A vacuum braking-force booster has a sequential control valve without a response path. First and second pressure chambers are separated by a diaphragm with a diaphragm disk in it and the diaphragm disk is connected with a shaft that supports a radially inward valve seat which passes against a spring biased sealing disk. Communication between the first and second chambers is past the inner valve seat. A shiftable sleeve extends through the lid of the first of the chambers and includes a collar which engages the inside of the lid for determining the maximum extent the sleeve can move out of the lid. A pressure piston extends through the sleeve. A bridge connects the sleeve with the pressure piston for moving together. An elastomeric bellows attaches the sealing disk to the sleeves and the pressure piston; the outer valve seat is defined on the sleeve for engaging the sealing disk. A spring normally urges the sealing disk toward both of the valve seats. A second flow path in the booster extends from the atmosphere through the bridge past the outer valve seat and into the first chamber. In an alternate embodiment, the outer valve seat is directly on the sleeve and the inner valve seat is directly on the valve shaft connected with the diaphragm disk. There is a return spring communicating with the diaphragm disk for urging the diaphragm disk to move the inner valve seat toward the sealing disk.

The response path is reduced practically to zero through the sleeve of the booster piston having an outer collar. As a result, upon return of the booster piston, the collar sleeve strikes against the housing of the vacuum booster before the following diaphragm disk and the collar comes, via the valve seat of the equalizing valve which is arranged thereon, against the sealing disk arranged in the collar sleeve. In this connection, the length of the valve shaft with the end valve seat of the equalizing valve on the diaphragm disk is so dimensioned that the diaphragm disk does not come against the housing. A mixed pressure builds up in the rear chamber of the vacuum booster against the force of the valve spring and of the return spring. For this reason, the diaphragm disk with the valve seat of the equalizing valve can "float" on the sealing disk.

The booster piston consists of the sleeve and the diaphragm disk with a valve housing integrated therein. On the end of the protruding valve shaft of the valve housing is a valve seat for the inner equalizing valve. The sleeve is arranged for displacement on the outer diameter of the valve shaft and is guided in sealing fashion in the housing lid. Its collar strikes against the housing. For this purpose, the sleeve with the outer control valve is connected rigidly via a bridge to the pressure piston and the piston rod integrated therein. Between the bridge and the pressure piston, there is clamped a valve bellows which is pressed by a pressure spring via its sealing disk against the valve seat of the outer control valve in the sleeve. In the operating condition with vacuum applied, the inner equalizing valve on the diaphragm disk with its valve seat on the valve shaft of the valve housing is held "floating" on the elastomeric spring disk of the valve bellows only by the mixed pressure which is built up in the rear chamber of the apparatus. The stop on the housing wall permits easy transfer of the aforementioned part testing forces to the housing. In the case of ordinary inner control valves arranged on the pressure piston, this force must be introduced via the sealing disk onto the stationary valve seat, which leads to premature destruction of the elastomeric sealing disk and thus to the failure of the apparatus. A pulling of the brake pedal also produces this same detrimental effect in the case of apparatus inserted in the vehicle. The new embodiment furthermore permits a uniformly distributed radial and parallel guided arrangement of the flow channels for both chambers, which make it possible to use the same collar-sleeve diameter as on the shaft piston neck of traditional booster pistons. By this construction, flow noises are reduced and the weakening of load-bearing cross sections is avoided.

Other objects and features of the invention will be described below with reference to the drawings.

DESCRIPTION OF THE PREFERRED EMBODIMENTS

Figure 1:
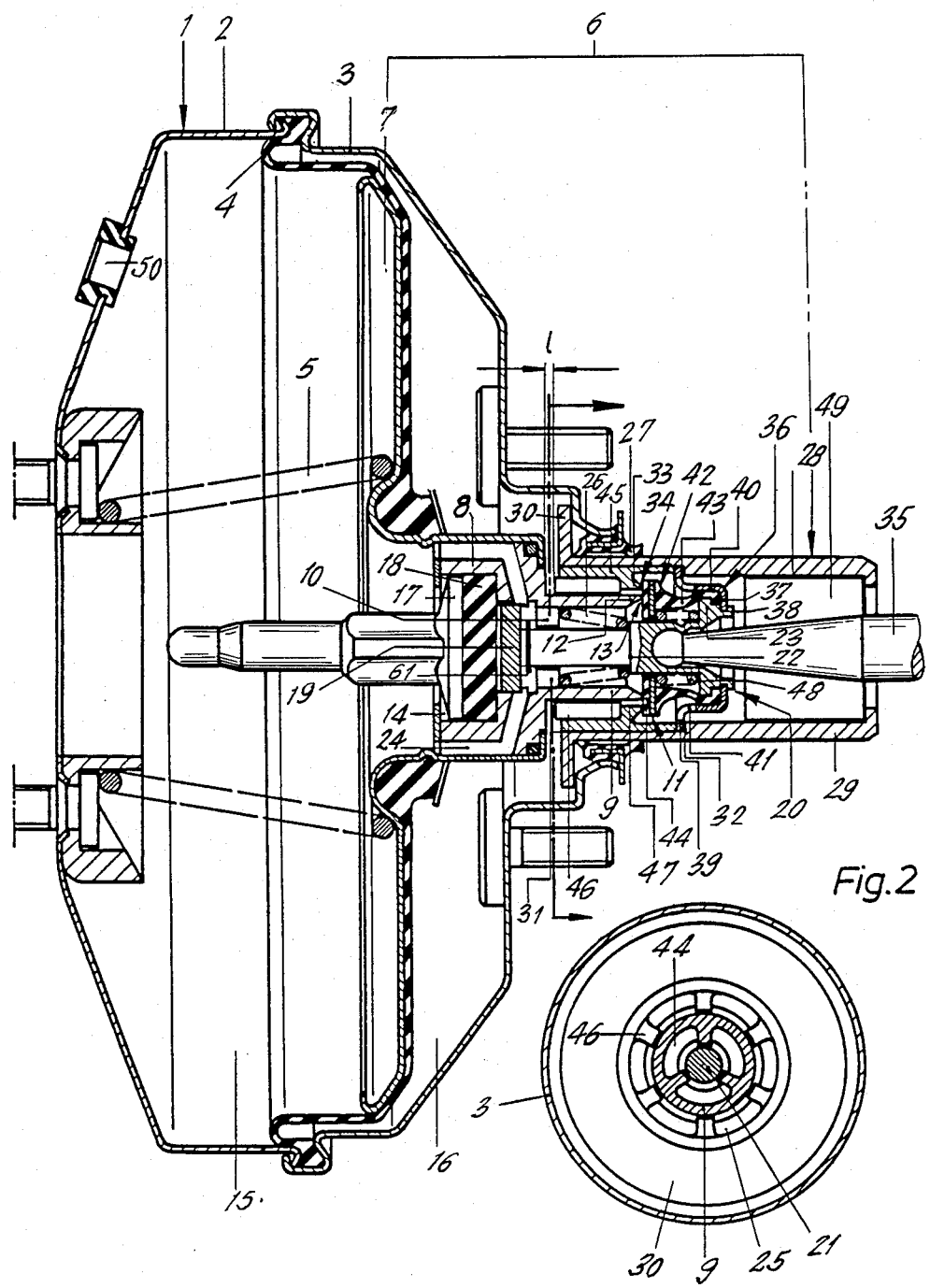
FIG. 1 is a longitudinal section through a vacuum brake-force booster according to the invention.

FIG. 1 shows the vacuum braking-force booster 1. It comprises the housing 2, the cooperating cup-like lid 3, the elastomeric diaphragm 4 supported at its periphery and between the housing 2 and the lid 3, the return spring 5 between the diaphragm disk 7 and the housing 2 for biasing return of the diaphragm disk, and the divided booster piston 6.

The booster piston 6 is comprised of the diaphragm disk 7, which acts together with the smaller diameter valve housing 8, and the sequentially operable control valve 11 which is free of a response path. The sequential control valve 11 is divided in two. The integrated valve housing 8 has a valve shaft 9 which passes through the center of the diaphragm disk 7 and protrudes beyond the disk 7, to the right in FIG. 1, with reduced diameter. On its end, the shaft 9 carries the valve seat 12 of the equalizing valve 13 which connects the two chambers 15 and 16 of the vacuum braking-force booster 1. Those chambers are on opposite sides of the diaphragm 4.

On its inside, the valve housing 8 has a concentric stepped borehole 14. The section of largest diameter of the borehole faces the front chamber 15. The largest diameter section of the borehole defines a seat for the pressure piece 17 together with the reaction disk 18 which is behind the pressure piece. The adjacent smaller diameter section of the stepped borehole 14, to the right of piece 17, receives the disk 19, which lies loosely with axial play on the end side of the first piston section 21 of the pressure piston 20. The borehole 14 extends further through the valve shaft 9 of the valve housing 8 beyond the disk 19 and from there connects the two chambers 15 and 16 of the vacuum braking-force booster 1 together via the flow channels 24. The channels 24 pass through the valve housing 8. The connection between chambers 15 and 16 is also past the valve seat 12 of the equalizing valve 13.

Furthermore, in this section of the borehole, there are supporting ribs 10 which are arranged indexed and which form one axial support for the valve spring 26. The spring also rests against the collar 22 of the front piston section 21 on the pressure piston 20 which is its other axial support.

The second structural part of the sequential control valve 11 which has no response path includes the external sleeve 28, which includes an inward end that extends into and rests against the interior of the lid 3 of the vacuum braking-force booster 1. The sleeve passes inside the sealing and guiding element 27. By its below-described connection to the valve seat 33 of the outer control valve 34, the sleeve 28 forms a rigid unit together with the independently movable pressure piston 20, the piston rod 35 which moves with the piston 20, the bridge 36 and the valve bellows 42.

The collar sleeve 28 is comprised of the external sleeve part 29, which terminates inside the lid 3 in the collar 30, and the insert part 45, which is fastened, by bonding or welding, upon mounting in the step-wise borehole 31 arranged on the collar side of the collar sleeve 28. On its inside diameter, the cylindrical insert part 45 has ribs 46 which lie in indexed fashion and which extend axially and protrude to the left beyond the flat side of the collar 30. In this way, the passage of the atmosphere is maintained, even with the vacuum shut off, by the ribs 46 resting against the valve housing 8. The ribs 46 debouch, via an annular collar 47 of larger diameter, onto the axially developed valve seat 33, which is formed on the collar 47, of the control valve 34. Furthermore, the ribs 46 guide the valve shaft 9 of the valve housing 8. As a result, the housing 8, together with the diaphragm disk 7, on the one hand, and the sleeve 28, on the other hand, are guided relative to each other. The valve seats 12 and 33 of the equalizing valve 13 and the control valve 34, respectively, are concentric to each other. When the vacuum is applied, those valve seats are on the reinforced sealing disk 43 of the valve bellows 42.

The bridge 36 is a molding of cup-shaped development having openings 41 provided radially on its circumference. It holds the collar sleeve 28 and the pressure piston 20 rigidly with respect to each other. In this connection, the extended collar 39 of the bridge 36 comes against the shoulder 32 of the stepped borehole 31 in the collar sleeve 28 and is held axially by the bonded or welded insert part 45. The bottom part 37, provided with a central borehole 38, is flanged, together with the pressure piston 20, on the collar 23 of the latter. Between the wall 40 of the bridge 36 and the circumferentially profiled collar 23 of the pressure piston 20, the elastomeric bellows 43 of a valve bellows 42 is clamped hermetically in form-locked manner. The sealing disk 44 of the bellows 42, which is guided on the pressure piston 20, is pressed by the inner compression spring 48, seated at one end on the collar 23 of the pressure piston 20, against the valve sealing seats 12 and 33.

The manner of operation of the control valve without response path is now described.

In FIG. 1, the front chamber 15 of the braking-force booster 1 is connected in the basic position to vacuum, applied via the connection 50. By means of the return spring 5, the elastomeric diaphragm 4, the diaphragm disk 7, the valve housing 8 and, via the valve spring 26, the sleeve 28 with the collar 30 are held against the inside of the lid 3. The two valve seats 12 and 33 of the equalizing valve 13 and control valve 34, respectively, rest on the sealing disk 44 of the valve bellows 42 and separate the chambers 15 and 16 from each other and the atmosphere from the inside of the apparatus.

If now a stroke to the left is introduced on the brake pedal via the piston rod 35, which is movably mounted in the pressure piston 20, the valve seat 33 of the outer control valve 34 lifts off from the sealing disk 44 of the valve bellows 42. As a result, the atmosphere present on the piston side at the control valve 34 flows through the air filter 49, arranged in the sleeve part 29 of the sleeve 28, and through the openings 41, flowing past the raised valve seat 33 and through the flow channels 25, divided by the ribs 46, into the rear chamber 16 of the vacuum braking-force booster 1. This produces a pressure difference between the two sides of the diaphragm disk 7. The force of this difference, resulting from the product of pressure difference times piston area, pushes the disk 7 from its position of rest immediately to the left and, via the reaction disk 18, actuates the pressure piece 17, which in its turn acts on the main brake cylinder, not shown. In this connection, the sealing disk 44 lies on the valve seat 12 on the valve shaft 9 of the housing 8 and moves to the left with the now loaded diaphragm disk 7 until the sealing disk 44 of the valve bellows 42, which is further pressed by the valve spring 26, again reaches the valve seat 33 of the outer control valve 34. The atmosphere which continues to flow through the valve gap during the running-on movement of the sealing disk 44 builds up a pressure gradient between the two chambers 15 and 16, which gradient increases until the force produced by the corresponding pressure gradient on the diaphragm disk 7 is equal to the force on the main brake cylinder. The sealing disk 44 at the same time comes sealingly to rest against the valve seat 33 of the outer control valve 34. Equilibrium of forces prevails between the force exerted by the main cylinder and the return spring 5 on the pressure piece 17, on the one hand, and the foot actuating force applied by the driver plus the pressure difference force acting on the diaphragm disk 7, on the other hand. The equalization process described takes place continuously after the sealing disk 44 comes against the valve seat 33. The pressure piston 20, in this connection, upon increasing pedal pressure, continuously follows the booster piston until the corresponding brake position is reached with corresponding increase of pressure in the rear chamber 16. The vacuum braking-force booster, after the rise with increasing actuating force up to the surrounding pressure, reaches the greatest possible pressure difference, i.e., the maximum support. The braking-force booster 1 is now uncontrolled, so that upon further increase of the actuating force via the piston rod 35, pressure piston 20 and disk 19, the force acting on the main cylinder increases only to the extent that the force on the piston rod 35 is increased. Upon rapid actuation of the piston rod 35, the valve seat 33 lifts off at most by the valve stroke "1" until the ribs 46 lie against the valve housing 8.

After the braking process, if the piston rod 35 is relieved of force, then the tensioned return spring 5 pushes the working piston 6 back into the basic position. During the return, the valve spring 26, which rests tensioned on the inside against the ribs 10 of the valve housing 8 and against the collar 22, presses the inner valve seat 12 away from the sealing disk 44 until the ribs 10 come against the safety ring 61 which is fastened to the piston section 21 of the pressure piston 20. The sealing disk 44 is, in its turn, brought in sealing fashion to rest against the outer valve seat 33 of the control valve 34 by the pressure spring 48 in the return phase of the work piston 6 immediately after the release of the piston rod 35 and the overcoming of the valve opening path. The atmosphere is blocked off and a pressure equalization takes place via the flow channels 24 and 25 between the two chambers 15 and 16 until the declining supporting force exerted by the atmosphere on the diaphragm disk is equal to the force of the tensioned return spring 5. Upon the return stroke which now commences, the force of the return spring 5 pushes the work piston 6 into the basic position only to the extent that the force exerted by the declining atmospheric pressure in the chamber 16 on the diaphragm disk 7 decreases. In the basic position, the sleeve 28 with its collar 30 and the closed control valve 34 strikes against the lid 3 of the vacuum braking-force booster 1. The lagging valve seat 12 is now pressed by the return spring 5 in addition against the force of the valve spring 26 onto the sealing disk 44 so that the latter comes to rest "floating" without play as a result of the correspondingly long valve shaft 9. The diaphragm disk 7 does not strike against the lid 3. This condition of equilibrium, when both valve seats 12 and 33 are lying against the sealing disks 44 and the vacuum is present at the connection 50, between the sum of the forces of the return spring 5 and the valve spring 26 and the guide friction of the housing shaft 9 is obtained by the residual atmospheric pressure remaining in the rear chamber 16 when the valve seat 12 runs onto the sealing disk 44, the force of which pressure is of the same amount at the time of the closing of the valve. The next actuating stroke on the piston rod 35 thus permits an opening of the control valve 34 without valve closure path and thus an immediate commencement of the stroke of the booster piston 6 in the vacuum braking-force booster 1.

Figure 2:
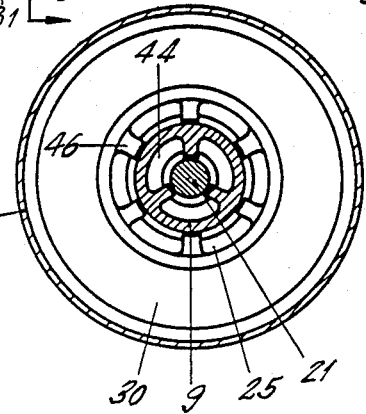
FIG. 2 is a section through the control valve which is without response path.

FIG. 2 is a section through the sequential control valve 9 without the response path. In this view, the guidance movement between the valve housing 8 and the sleeve 28 is evident, as the ribs 46 guide the valve shaft 9 on its outer diameter. By this guidance, symmetrically arranged flow channels 25, which are short and simple to shape, are produced with optimal utilization of the cross sectional area available.

Figure 3:
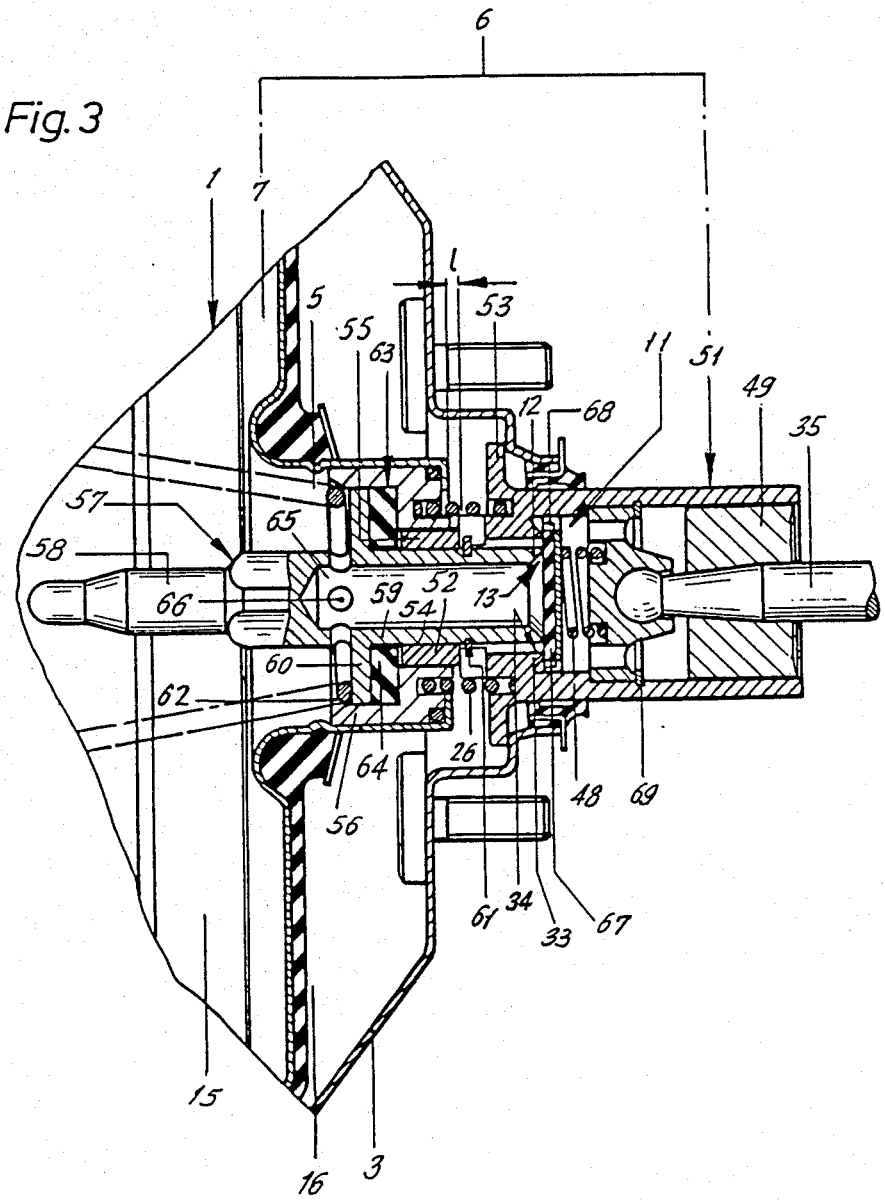
FIG. 3 shows a variant of FIG. 1 with centrally located flow channel and ring-shaped reaction element.

FIG. 3 shows a variant of a vacuum braking-force booster 1 in cross section. In this case, the sleeve 51, which is also connected with a collar 53, is guided for axial displacement via its neck part 52, in contrast to FIG. 1, in a housing 56 of the diaphragm disk 7 and in the lid 3. The section 54 of the borehole that is present in the neck part 52 lies, together with the front section of the borehole of a stepped borehole 62 of the housing 56, concentric to one another, and the two of them form a seat and guide for a ram 57. This ram 57 is developed on one side as pressure piece 58 while its opposite end terminates as sleeve part 59. On the outer diameter of the sleeve 59, there is formed a collar 60 which is guided in the larger borehole section of the stepped borehole 62 and limits a reaction chamber 63 which encloses an elastomeric reaction disk 64, developed as a ring disk element. The valve seat 12 of the inner equalizing valve 13 and also the axially extending blind hole 65 are arranged on the end of the sleeve 59. The blind hole 65, by means of radial flow channels 66 introduced behind the collar 60 connects the front chamber 15 to the rear chamber 16 past the inner equalizing valve 13. The sleeve 51 has, in principle, the same construction as described in FIG. 1. The direct use of the end surface 55 of the neck part 52 for the striking of the reaction disk 64 in order to produce the proportional reaction of the apparatus on the piston rod 35 permits the simple development and arrangement of a reinforced, flat, elastomeric sealing disk 67 with flow channels 68 developed on its circumference and which in known manner is pressed by the compression spring 48, which rests on the bridge 69 rigidly connecting the piston rod 35 and the sleeve 51, against the outer valve seat 33 and the valve seat 12. In contrast to the solution shown in FIG. 1, the valve spring 26 is positioned in the rear chamber 16 of the vacuum braking-force booster 1. The compression spring 5, which rests on the collar 60 of the ram 57, presses the ram 51, and indirectly via the annular reaction disk 64 also the diaphragm disk 7, back into the basic position until the valve seat 12 of the ram 51 comes against the sealing disk 67. The relative movement between ram 51 and diaphragm disk 7 produced in this connection by the valve spring 26 is limited by the securing ring 61 and binds the ram 57 and the sleeve 51 to each other.

Another solution (not shown) consists of binding the diaphragm with the integrated housing 56 to the sleeve 51 with the retention of the valve stroke "1". The operation of this non-response-path sequential control valve 11 is the same as previously described.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A vacuum braking-force booster, comprising:

a first and a second pressure chamber; a movable diaphragm separating the chambers, a disk on the diaphragm for movement with the diaphragm;

a sleeve movable toward and away from the diaphragm disk; a sealing disk in the sleeve for sealing against valve seats;

a radially more inward inner valve seat attached to the diaphragm disk and movable therewith selectively into engagement with the sealing disk and out of contact with the sealing disk;

a radially more outward outer valve seat outward of the inner valve seat in the sleeve and the outer valve seat being connected with the sleeve to move with the sleeve selectively into engagement with the sealing disk and out of contact with the sealing disk;

first biasing means for urging the sealing disk against the valve seats;

a lid over and defining that end of the first chamber that faces toward the sleeve; the sleeve extending through the lid and the sleeve being guided for movement with respect to the lid; the sleeve having a stop on it, and the stop being inside the lid and contacting the lid as the sleeve is being moved outwardly of the lid, the stop serving for halting further motion outwardly of the sleeve upon contact of the stop and the lid;

a valve shaft supported to the diaphragm disk; the inner valve seat being defined on the valve shaft, and the inner valve seat extending up to the sealing disk where the inner valve seat forms a seal with the sealing disk;

a first flow path in the booster from atmosphere past the outer valve seat and into the first chamber;

a second flow path in the booster between the first and the second chambers and past the inner valve seat;

a pressure piston in the sleeve and connected with the outer valve seat such that force applied to the pressure piston raises the outer valve seat off the sealing disk while the inner valve seat is not raised off the sealing disk; and a valve bellows in the sleeve, and the sealing disk being defined on the bellows; the bellows being elastomeric and being guided on the pressure piston; a spring between the pressure piston and the bellows near the sealing disk for urging the sealing disk toward the valve seats.

2. The vacuum braking-force booster of claim 1, wherein the sleeve is guidingly supported for motion along the valve shaft.

3. The vacuum braking-force booster of claim 1, wherein the stop of the sleeve comprises a collar on the sleeve which is disposed in the lid and which is shaped for resting against the lid.

4. The vacuum braking-force booster of claim 3, further comprising an insert part supported inside the sleeve; ribs being formed at one end of the insert part and the ribs extending past the collar of the sleeve for the ribs to engage the diaphragm disk upon movement of the sleeve toward the second chamber before the collar engages the diaphragm disk, the ribs having other ends which extend to the outer valve seat.

5. The vacuum braking-force booster of claim 1, further comprising a bridge between the sleeve and the end of the bellows that is away from the sealing disk.

6. The vacuum braking-force booster of claim 5, wherein the bridge rigidly connects the pressure piston and the sleeve.

7. The vacuum braking-force booster of claim 6, wherein the bridge is cup shaped and the bridge includes a central part with a central opening; the bridge having radial openings through the bridge for enabling communication from the atmosphere past the bridge and to the outer valve seat.

8. The vacuum braking-force booster of claim 1, further comprising a spring for urging the diaphragm disk and the valve shaft to move the inner valve seat against the sealing disk.

9. A vacuum braking-force booster, comprising:

a first and a second pressure chamber; a movable diaphragm separating the chambers, a disk on the diaphragm for movement with the diaphragm;

a sleeve movable toward and away from the diaphragm disk; a sealing disk in the sleeve for sealing against valve seats;

a radially more inward inner valve seat attached to the diaphragm disk and movable therewith selectively into engagement with the sealing disk and out of contact with the sealing disk;

a radially more outward outer valve seat outward of the inner valve seat in the sleeve and the outer valve seat being connected with the sleeve to move with the sleeve selectively into engagement with the sealing disk and out of contact with the sealing disk;

first biasing means for urging the sealing disk against the valve seats;

a lid over and defining that end of the first chamber that faces toward the sleeve; the sleeve extending through the lid and the sleeve being guided for movement with respect to the lid; the sleeve having a stop on it, and the stop being inside the lid and contacting the lid as the sleeve is being moved outwardly of the lid, the stop serving for halting further motion outwardly of the sleeve upon contact of the stop and the lid;

a valve shaft supported to the diaphragm disk; the inner valve seat being defined on the valve shaft, and the inner valve seat extending up to the sealing disk where the inner valve seat forms a seal with the sealing disk;

a first flow path in the booster from atmosphere past the outer valve seat and into the first chamber;

a second flow path in the booster between the first and the second chambers and past the inner valve seat;

a pressure piston in the sleeve and connected with the outer valve seat such that force applied to the pressure piston raises the outer valve seat off the sealing disk while the inner valve seat is not raised off the sealing disk;

the sleeve has defined on it the outer valve seat; the valve shaft comprising a ram, and the ram passing through the diaphragm disk and extending into the sleeve; the ram including a ram sleeve thereon, on which the inner valve seat is defined; a return spring for the valve shaft for moving the diaphragm disk and the ram to move the inner valve seat onto the sealing disk;

a passage through the ram and communicating into the second chamber; the communication between the first and second chambers being past the inner valve seat and through the passage in the ram.

* * * * *